(12) United States Patent
O'Keeffe et al.

(10) Patent No.: US 7,747,238 B2
(45) Date of Patent: Jun. 29, 2010

(54) WIRELESS COMMUNICATION DEVICE AND DATA INTERFACE

(75) Inventors: Conor O'Keeffe, Douglas (IE); Paul Kelleher, Classis Lake (IE)

(73) Assignee: Freescale Semiconductor, Inc., Austin, TX (US)

( * ) Notice: Subject to any disclaimer, the term of this patent is extended or adjusted under 35 U.S.C. 154(b) by 577 days.

(21) Appl. No.: 11/574,756

(22) PCT Filed: Sep. 6, 2004

(86) PCT No.: PCT/EP2004/052054

§ 371 (c)(1),
(2), (4) Date: Mar. 6, 2007

(87) PCT Pub. No.: WO2006/027025

PCT Pub. Date: Mar. 16, 2006

(65) Prior Publication Data

US 2007/0254599 A1   Nov. 1, 2007

(51) Int. Cl.
 H04B 1/10 (2006.01)
(52) U.S. Cl. .................. 455/310; 455/317; 455/309
(58) Field of Classification Search ................ 455/310, 455/317–319, 309, 312
 See application file for complete search history.

(56) References Cited

U.S. PATENT DOCUMENTS

| | | | |
|---|---|---|---|
| 4,939,470 A * | 7/1990 | Kang | 455/310 |
| 5,422,889 A * | 6/1995 | Sevenhans et al. | 455/324 |
| 6,720,943 B1 | 4/2004 | Lee et al. | |
| 6,737,904 B1 | 5/2004 | Butaud et al. | |
| 6,871,055 B2 * | 3/2005 | Hirano et al. | 455/310 |
| 6,934,341 B2 * | 8/2005 | Sahlman | 455/114.1 |
| 7,035,606 B2 | 4/2006 | Matsuura et al. | |
| 7,386,059 B2 | 6/2008 | Pilgram et al. | |
| 2003/0100280 A1 | 5/2003 | Kusbel et al. | |
| 2008/0132191 A1 * | 6/2008 | Quinlan et al. | 455/302 |

FOREIGN PATENT DOCUMENTS

| | | |
|---|---|---|
| EP | 1394972 B1 | 3/2006 |
| JP | 04064839 | 6/1992 |
| JP | H07015390 A | 1/1995 |
| JP | H11215024 A | 8/1999 |
| WO | 02/056487 A2 | 7/2002 |
| WO | 02/056488 A2 | 7/2002 |
| WO | 02/091601 A2 | 11/2002 |

OTHER PUBLICATIONS

Fogg; "DigRF baseband / RF Digital Interface Specification"; Feb. 2004; Digital Interface Working Group; www.digrf.com.

* cited by examiner

*Primary Examiner*—Lana N Le

(57) ABSTRACT

A wireless communication device comprises a number of sub-systems operably coupled to a data interface for routeing data between the number of sub-systems. A clock generation function generates a clock signal substantially at a data transfer rate to be used over the data interface whereby the clock signal is generated at a rate that minimises harmonic content of the clock signal at operational frequencies of the wireless communication device. Thus, a suitable data rate is selected and supported by the data interface that accommodates the desired bandwidth, clock rate and/or chip rate of the functional elements that are coupled by the data interface within the wireless communication device, whilst minimising the effects of harmonic interference from the clock signal(s).

12 Claims, 4 Drawing Sheets

WIRELESS COMMUNICATION DEVICE AND DATA INTERFACE

FIELD OF THE INVENTION

This invention relates to a data interface for a wireless communications device. The invention is applicable to, but not limited to, data interfaces for multimode wireless communication devices.

BACKGROUND OF THE INVENTION

Wireless communication devices, such as mobile phone handsets, require a very high level of integration of hardware and firmware/software in order to achieve the necessary density of functionality, i.e. to realise the necessary functionality in a minimum device volume and at a minimum cost. An optimal wireless communication device design must also minimise power consumption in order to increase the battery call time and/or stand-by time.

Wireless communication devices also incorporate a number of distinct and operably coupled sub-systems, in order to provide the wide variety of functions and operations that a complex wireless communication device needs to perform. Such sub-systems comprise radio frequency power amplification functions, radio frequency integrated circuits (RFIC) comprising radio frequency generation, amplification, filtering, etc. functions, baseband integrated circuits (BBIC) comprising audio circuits, encoding/decoding, (de)modulation functions, processing functions, etc. and memory units.

Interfaces, which are often standardised to allow commonality and increased functionality between different chip-set manufacturers and different handset manufacturers, are defined for communicating between the respective sub-systems.

One typical interface found in a wireless communication device is the interface between a baseband integrated circuit (BBIC) and a radio frequency integrated circuit RFIC). Pins on ICs are used to route electrical signals between devices/elements/functions. It is generally desirable to minimise the number of pins in ICs used in wireless communication devices, as the use of extra pins, for example on a BBIC-RFIC interface, increases IC area, increases IC cost and complexity and increases power consumption.

In the field of mobile phones, a consortium of mobile phone manufacturers has been formed to define various sub-system interfaces, particularly interfaces between variants of second generation of cellular phones (2.xG) when migrating to cover additional, future wireless communication technologies, such as multimode transceivers additionally employing third generation (3G wideband code division multiple access (WCDMA) technology. This consortium is known as 'DigRF', and details of the defined interfaces and functionality thereof, particularly in a multimode mobile phone scenario, can be obtained from the DigRF consortium. It is noteworthy that Multimode operational specifications are not yet available at the time of filing this patent application.

One interface being defined by the DigRF consortium is the BB-RF interface standard, which encompasses a serial data interface for Receive (Rx) and Transmit (Tx) variants of second generation of cellular phones (2.xG) chipsets. When defining the interface to also accommodate the increased complexity and data rate required for 3G technology, it is clearly advantageous to minimise the IC pin count.

Furthermore, the standardised RFIC-BBIC interface for the current 2.xG mobile phone products does not provide for simultaneous Rx and TX data transfer to the RFIC. Although, providing such a simplex operation is acceptable in a 2G environment and 2G variants thereof, the corresponding limited bandwidth is not sufficient for 3G Rx or Tx operation.

Additionally, the standardised system clock frequency used in 2G mobile phones (SysClk) is defined as 26 Mhz. This frequency sets a useful data rate for 2.xG modes of operation. For 3G operation, it is not as useful as it is not an integer multiple of the WBCDMA chip rate.

The inventors of the present invention have recognised and appreciated that a further problem exists with running data interfaces oil such a radio transceiver system (say between the RFIC and the BBIC) in that to generate and decode random data patterns a clock source is required at the data rate, or an integer multiple thereof. This clock source is uniform and therefore the harmonic content of the clock source will not be spread.

Thus, a significant problem in the field of wireless communication devices is that the harmonic content power of clocks are known to radiate signals at frequencies that coincide with transmit and receive signals of the transceiver.

Notably, the 'DigRF' 2G standard for use in global system for Mobile telecommunications (GSM) standard mobile terminals has adopted a system clock rate of 26 MHz on the data interface between the baseband integrated circuit (IC) and the radio frequency (RF) IC. Notably, the use of such a defined clock rate creates fourteen harmonics in the GSM quad-band Rx and Tx frequency bands, i.e. the four frequency bands allocated for GSM in various regions of the world. This harmonic content problem generated by the clock signals running at 26 MHz requires radio transceiver designers to use slew rate control clocks to limit this problem.

Furthermore, very careful layout of the printed circuit board for the ICs used in the device is then required, to minimise the effect of these harmonics. Thus, the selection of a particular clock rate has a significant impact on the corresponding circuitry designed into the wireless communication device.

U.S. patent—U.S. Pat. No. 6,737,904 B1—of Philips Electronics N.V. discloses a 2G phone BBIC that aims to address the problems associated with the GSM 26 MHz system clock. U.S. Pat. No. 6,737,904 B1 discloses a mechanism of dynamically applying a random number generator to a 26 MHz clock signal to introduce jitter, and therefore introduce phase changes to the clock signal in order to spread noise.

A further solution to harmonic interference (purely and notably in a 2G environment) has been proposed in WO2002056488A2, inventor of Tuttle et. al. and titled Digital Interface Apparatus and Associated methods. In WO2002056488A2 suppression of interference between 2G ICs is performed using band limiting single-ended circuits and differential signals and an optimum die partition within the RF sub-system.

A further solution to harmonic interference, in the context of liquid crystal displays, is proposed in U.S. Pat. No. 6,720,943 B1, inventor Kim et. al. and titled Data Interface device. U.S. Pat. No. 6,720,943 B1 proposes to spread the electromagnetic interference (EMI) by means of a clock dithering mechanism.

A problem associated with the clock dithering mechanism proposed in U.S. Pat. No. 6,720,943 B1 is that clock dithering spreads the noise but reduces the reliability of the data link. The use of a clock dithering mechanism creates a further problem in that there is increased hardware overhead. Dither needs to be random so as not to generate new tones. Thus, this technique attempts to reduce the contribution of harmonic noise to an RE sub-system, but fails to minimise or eliminate the harmonic noise.

Thus, existing solutions to clock harmonics attempt to 'reduce' the impact of the harmonic, predominantly by dithering the clock signal to spread the noise. A need therefore exists for a mechanism to incorporate integrated circuits/sub-systems and a corresponding data interface, within a wireless communications device, without incurring increased cost or complexity or increased pin count whilst minimising or eliminating the effects of harmonic interference of the clock signal(s).

STATEMENT OF INVENTION

In accordance with aspects of the present invention, there is provided a data interface, a wireless communication device and an integrated circuit therefor as defined in the appended Claims.

BRIEF DESCRIPTION OF THE DRAWINGS

Exemplary embodiments of the present invention will now be described, by way of example only, with reference to the accompanying drawings, in which.

DESCRIPTION OF PREFERRED EMBODIMENTS

The preferred embodiment of the present invention will be described in terms of a wireless communication device, such as a multimode 3G-2.xG mobile telephone. However, it will be appreciated that the invention may be embodied in any other type of wireless communication device that incorporates a data interface between respective sub-systems within the device.

Figure 1:
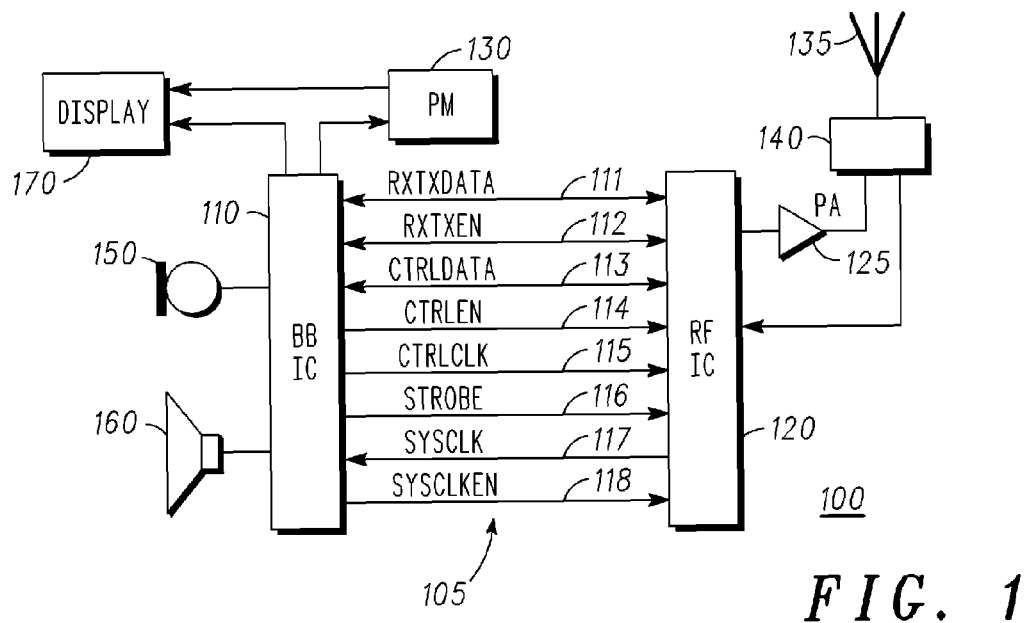
FIG. 1 illustrates a simplified block diagram of a wireless communication device, illustrating a BBIC-RFIC interface as defined by the DigRF 2.xG standard, adapted in accordance with the preferred embodiment of the present invention.

Referring first to FIG. 1, there is shown a simplified block diagram of part of a wireless communication device 100, adapted to support the inventive concepts of the preferred embodiments of the present invention. The wireless communication device 100, in the context of the preferred embodiment of the invention is a multimode 3G-2.xG mobile telephone. As such, the wireless communication device 100 contains an antenna 135, preferably coupled to a 3G duplex filter or 2.xG antenna switch 140, that provides isolation between receive and transmit chains within the wireless communication device 100. The receiver chain, as known in the art, includes numerous receiver circuitries such as receiver front-end circuitry effectively providing reception, filtering and intermediate or base-band frequency conversion. The receiver circuitry is preferably predominantly formed on a radio frequency integrated circuit (RFIC) 120. The RFIC 120 is preferably coupled to a number of other elements/functions (not shown) such as signal processing functions, memory elements, etc.

As known in the art, the RFIC 120 is operably coupled to a baseband IC (BBIC) 110 that performs a number of signal processing operations at baseband frequencies, such as decoding/encoding, (de)modulation, (de-)interleaving functions and the like. The BBIC 110 is preferably coupled to a number of other elements/functions (not shown) such as signal processing functions, memory elements, etc. The BBIC 110 preferably comprises a timer or clock function (not shown), or is operably coupled to an external timer or clock, to control the timing of operations (transmission or reception of time-dependent signals) within the wireless communication device 100.

The coupling between the RFIC 120 and the BBIC 110 is preferably implemented via a RFIC-BBIC data interface 105, which comprises eight pins to carry electrical signals therebetween. The eight pins preferably comprise a RxTxdata line 111, a RxTxEn line 112, a CtrlData line 113, a CtrlEn line 114, a CtrlClk line 115, a Strobe line 116, a SysClk line 117 and a SysClkEn line 118.

It is envisaged that the BBIC 110 may be operably coupled to a plurality of RFICs 120 (not shown), where each RFIC has, say, a separate CtrlEn line 114 and a SysClkEn line 118. The BBIC is also preferably coupled to one or more output devices, such as audio speaker 160 and/or display 170.

As regards the transmit chain of the wireless communication device 100, this includes an input device, such as a microphone 150 and/or keypad (not shown), coupled to the BBIC 110. The RFIC in a transmit function is coupled to a radio frequency power amplifier 125 and thereafter to the antenna 135 via the antenna switch or duplex filter 140. A battery regulator (not shown) associated with the RFIC 120 is preferably under control of a power management unit 130, with the BBIC 110 maintaining control of the power management unit 130.

In accordance with the preferred embodiment of the present invention, the BBIC-RFIC interface, and therefore the BBIC and RFIC devices, have been adapted to function at a particular data rate that minimises harmonic interference at the frequencies transmitted from, or received to, the antenna 135. The preferred configurations of the RFIC-BBIC and data interface are further described with reference to FIG. 5 and FIG. 6.

Figure 2:
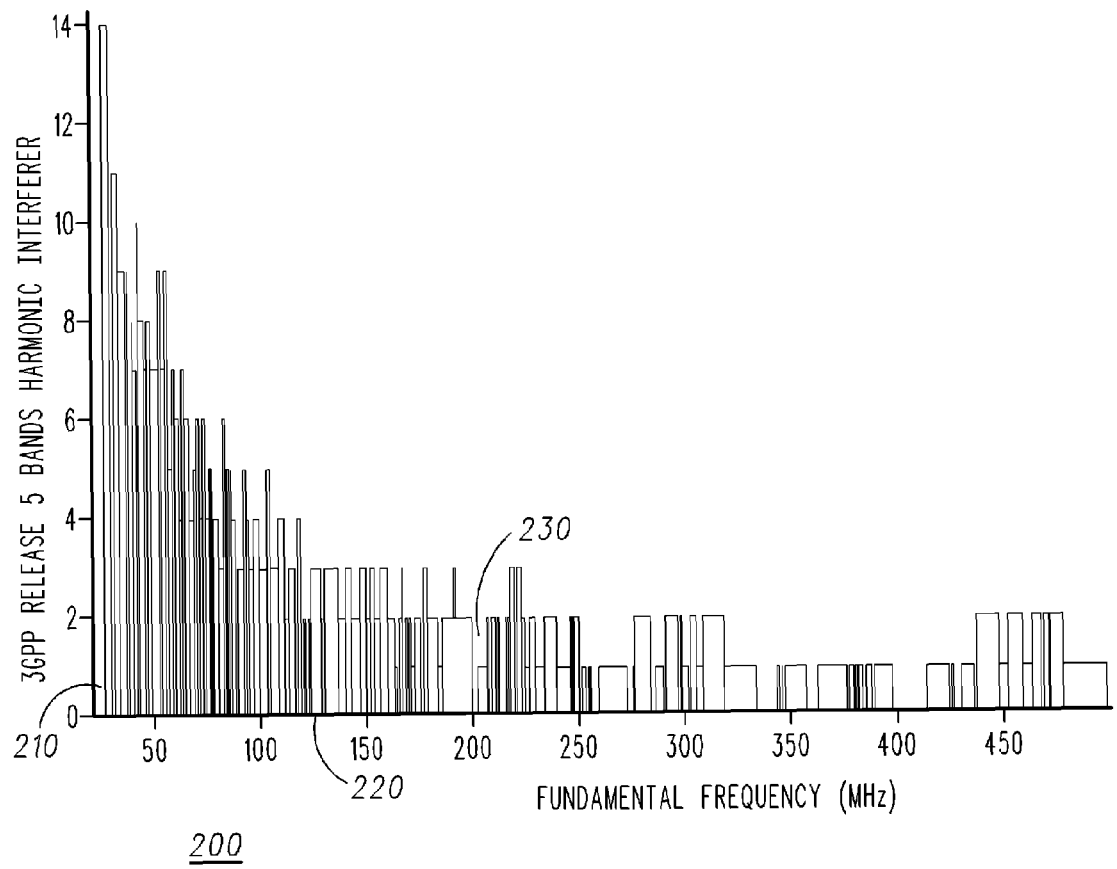
FIG. 2 shows a graph illustrating a number of harmonic interferers (measured in the Release 5 (2.xG and 3G) frequency bands set by the 3G Partnership Project) versus data rate (from 26 to 500 Mbits/sec)
Figure 3:
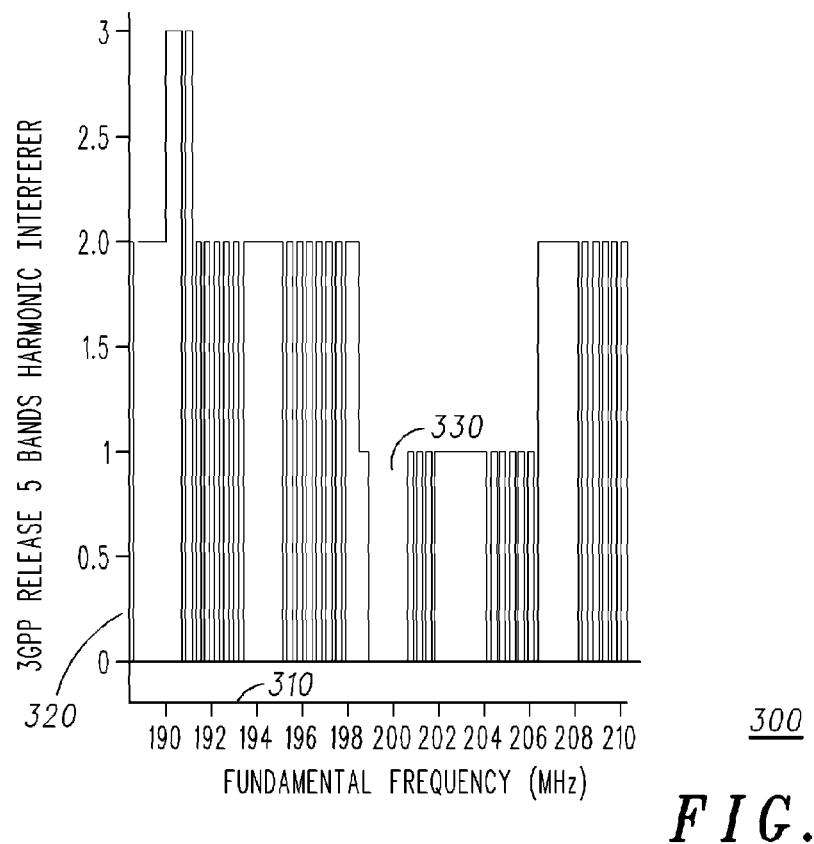
FIG. 3 shows a graph illustrating a number of Harmonic interferers (measured in the Release 5 (2.xG and 3G) frequency bands set by the 3G Partnership Project) versus data rate (from 188 to 212 Mbits/sec)

Referring now to FIG. 2 and FIG. 3, two graphs 200, 300 illustrate a number of harmonic interferers (where the analysis is directed to the Release 5 frequency bands controlled by the 3G Partnership Project (3GPP)) versus data rate (from 26 to 500 Mbits/sec in FIG. 2 and from 188 to 212 Mbits/sec in FIG. 3).

The y-axis 210, 310 illustrates the number of harmonic interferers falling on the aforementioned 3GPP Rx or Tx bands using a variety of clock rates 220, 320 as shown on the x-axis. Notably, in FIG. 3 the inventors of the present invention have identified a small frequency band close to 200 Mhz where no harmonics of the selected clock rate would fall on the critical 2.xG and 3G Rx or Tx bands. Thus, and advantageously, by setting a clock rate of approximately 200 MHz for the data interface to use, no harmonic interference of the 3GPP frequencies will be generated by the clock signals.

For a 3G transceiver it is important that the clock rate employed over the data interface be a multiple of the WBCDMA chip rate. The WBCDMA chip rate is 3.84 Mcs. A multiple of 3.84 Mcs is required for a single data serial interface between an RF subsystem and BB subsystems. Hence, the inventors of the present invention have selected a multiple of 52 times the 3G chip rate, i.e. a clock rate of 199.68 Mhz is used by the RFIC-BBIC data interface. Thus, the selection of a RFIC-BBIC clock rate of 199.68 Mhz facilitates accurate data transfer and data processing operations of the wireless communication device, whilst effectively eliminating harmonic content of the clock signal within the 3GPP Release 5 frequency bands.

Although the preferred embodiment of the present invention is described with respect to a serial data interface, it is envisaged that the inventive concepts apply equally to a parallel data interface.

Figure 4:
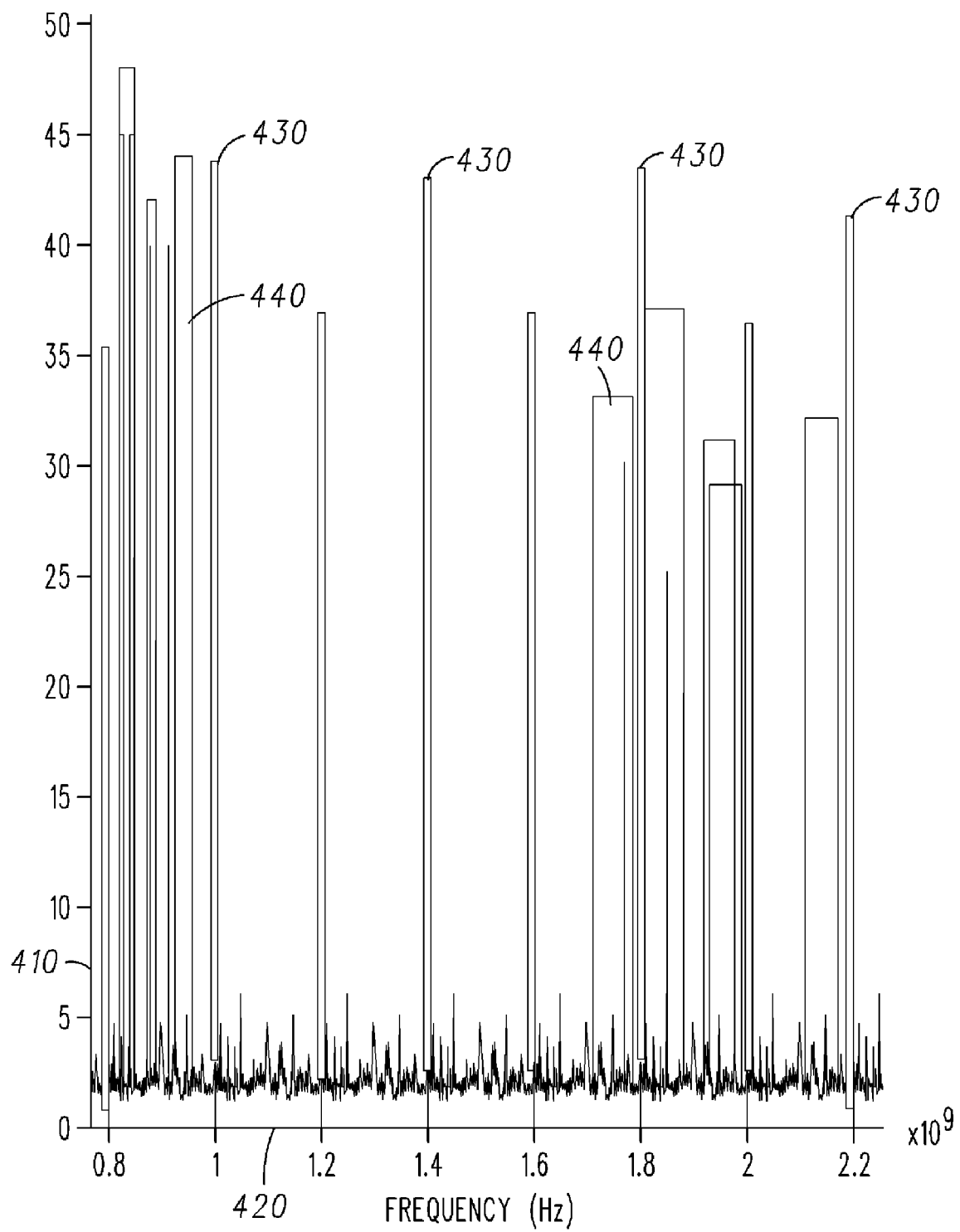
FIG. 4 illustrates a clock sequence power spectral density (PSD) graph of the 199.68 Mhz clock rate used in the preferred embodiment of the present invention.

FIG. 4 illustrates a graph 400 of a PSD (in dB) 410 of the 199.68 MHz clock signal versus frequency 420. It is noteworthy that the harmonics of the 199.68 MHz clock signal 430 fall outside the Tx and Rx bands for 2.xG and 3G 440, thereby alleviating the most difficult problem faced by radio transceiver designers. It is known that random data patterns of signals that are sent across the data interface spread the harmonic content of the data stream about the baud (symbol/bit rate). Thus, the harmonic content of the baud is also spread as a result.

It is desirable that the noise is spread over a wide bandwidth (BW). However, to recover data and transmit data, a clock source is required on each side of (or a clock signal is sent across) the interface. Harmonics of the clock signals are problematic due to their concentration of power at integer multiples of the clock in the frequency domain, i.e. there is no spreading. This is therefore a problem that needs resolving by the radio sub-system designer.

The PSD graph outlined in FIG. 4 illustrates the reasoning and harmonic interference minimisation (effectively elimination) benefits of selecting the 199.68 MHz interface for a 3G-2.xG multimode wireless communication device.

Figure 5:
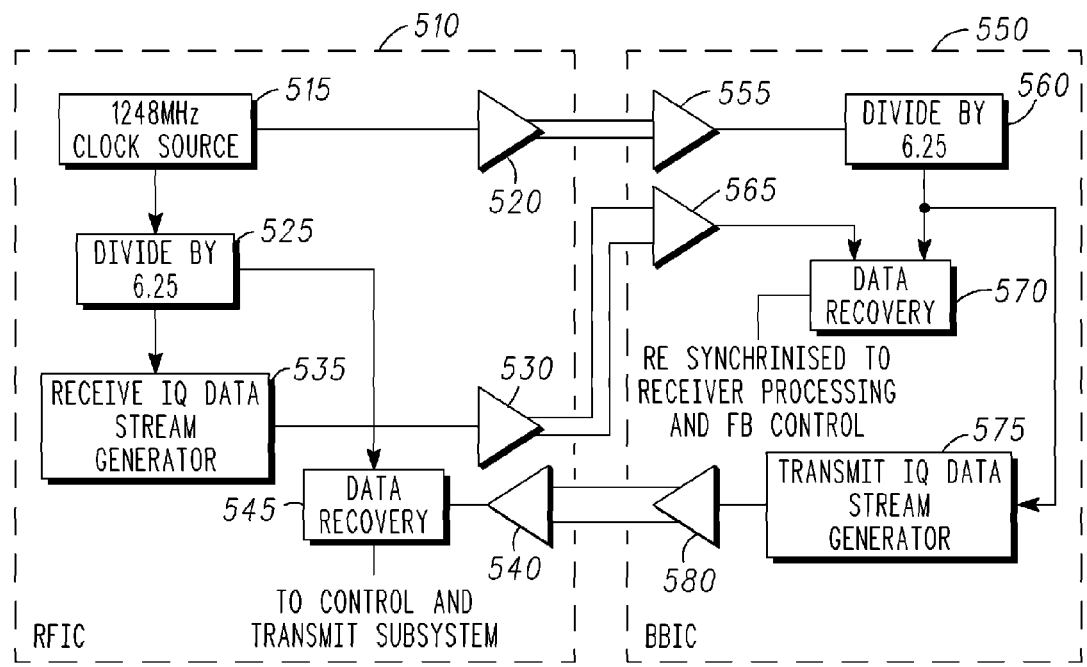
FIG. 5 illustrates a schematic block diagram of a BBIC-RFIC and associated data interface operating a 1248 MHz clock and 199.68 Mbps data stream in accordance with a first embodiment of the present invention.

Referring now to FIG. 5, a schematic block diagram of a BBIC-RFIC and associated data interface operating a 1248 MHz clock source and a 199.68 Mbps data stream is illustrated in accordance with a first embodiment of the present invention. Notably, the configuration illustrates a mechanism where a higher frequency clock source is sent across the interface where the clock frequency for the data transferred over the interface is derived from this higher clock source. Still, the need to generate a clock at the data rate is a requirement for data transfer on the data interface.

The preferred configuration employs a hardware design that avoids the need to incorporate a clock generation circuit at both sides of the data interface, whereby the clock signal is also transferred across the data interface. In this manner, the clock, or clock harmonics since the clock has to be a relatively uniform signal, concentrates the harmonic power at particular frequencies. However, it is envisaged that with some data interface architectures, it may prove advantageous to employ a clock source within each side of the data interface.

FIG. 5 illustrates a RFIC 510 operably coupled to a BBIC 550 across a data interface. The RFIC 510 comprises a 1248 MHz clock source 515, operably coupled to a first differential line driver 520. The 1248 MHz clock source 515 is operably coupled to a clock divider 525 to reduce the clock rate down to the desired 199.68 MHz rate. This clock rate is then used for I-Q baseband data generation 535 for transferring data over the data interface. The desired 199.68 MHz rate is also input to a data recovery function 545, which is preferably operably coupled to control and transmit sub-systems (not shown).

The I-Q baseband data generation function 535 of the RFIC 510 is operably coupled to a second differential line driver 530, to transmit I-Q data at 199.68 Mbps across the data interface. A differential buffer 540 receives transmit information from the BBIC 550 to be passed to the data recovery function 545 of the RFIC 510.

The BBIC 550 also comprises a first differential buffer 555 for receiving the raw 1248 MHz clock signal. Again, in the BBIC 550, the 1248 MHz clock signal is input to a clock divider 560 to reduce the clock rate down to the desired 199.68 MHz rate to be used for I-Q baseband data recovery in function 570. The clock rate is used by the I-Q baseband data recovery function 570 to recover data received over the data interface and buffered by BBIC second differential buffer 565. The data recovery function 570 outputs data that is re-synchronised and can be output to a Rx processing feedback control function/sub-system (not shown).

An I-Q baseband data generation function 575 of the BBIC 550 is operably coupled to a BBIC differential line driver 580, to transmit I-Q data at 199.68 Mbps across the data interface. A differential line buffer 540 of the RFIC 510 receives I-Q data at 199.68 Mbits/sec from the I-Q baseband data generation function 575 of the BBIC 550.

In this manner, a single clock source 515, selected to operate at a particular clock rate of 1248 MHz, is used to generate I-Q data streams in both the BBIC 550 and RFIC 510. Furthermore, the single clock source 515 is used to implement data recovery in both the RFIC 510 and BBIC 550 from data transmitted at the I-Q data rate of 199.68 Mbits/sec across the data interface. The use of this I-Q data rate of 199.68 Mbits/sec ensures that the clock signals passed over the data interface do not generate any harmonics at any of the 3GPP frequencies transmit from, or received to, the wireless communication device. A skilled artisan will appreciate that the Cartesian I-Q data format could be changed to some other data format for example polar magnitude and phase format.

Advantageously, by incorporating further divider functions coupled to the 1248 MHz clock source 515, the BBIC 550 and RFIC 510 are able to generate other clock signals. For example, a clock divider of 'divide by 48' coupled to the 1248 MHz clock source 515 would provide a clock signal of 26 MHz, which is '96' times the symbol rate of 2.xG, and a clock divider of 'divide by 325' coupled to the 1248 MHz clock source 515 would provide a clock signal at the 3G chip rate of 3.84 MHz.

Figure 6:
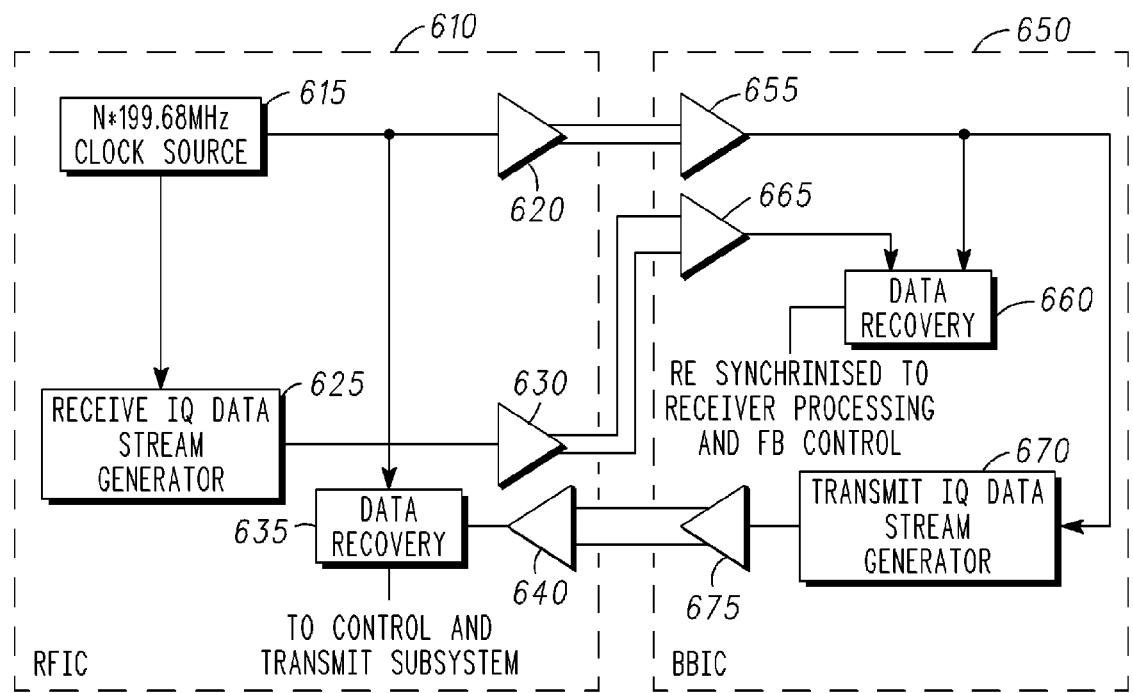
FIG. 6 illustrates a schematic block diagram of a BBIC-RFIC and associated data interface operating a 199.68 MHz or a multiple of 1-99.60 MHz clock and 1-99.68 Mbps data stream in accordance with a second embodiment of the present invention.

Referring now to FIG. 6, a second embodiment of the present invention is illustrated, whereby a RFIC 610 is operably coupled to a BBIC 650 across a data interface. The configuration of FIG. 6 is ideally suited to accommodate a 3G wireless communication device that will also not create harmonic content of the clock signal at 2.xG or 3G frequencies. The RFIC comprises an N*199.68 MHz clock source 615, operably coupled to a data stream generation function 620 for generating a data stream at 199.68 Mbits/sec. 'N' is defined preferably, but not necessarily, as an integer, to provide an integer multiple of the clock signal.

The N*199.68 MHz clock rate is also input to a data recovery function 635, which is preferably operably coupled to control and transmit sub-systems (not shown).

The Rx I-Q baseband data generation function 625 of the RFIC 610 is operably coupled to a second differential line driver 630, to transmit I-Q data at 199.68 Mbps across the data interface. A differential buffer 640 receives transmit information from the BBIC 650 to be passed to the data recovery function 635 of the RFIC 610.

The BBIC 650 also comprises a first differential buffer 655 for receiving the N4199.68 MHz, clock signal from the N*199.68 MHz clock source 615. Again, in the BBIC 650, the N*199.68 MHz clock signal is used for I-Q baseband data recovery in function 660. The clock rate is used by the I-Q baseband data recovery function 660 to recover data received over the data interface and buffered by the BBIC second differential buffer 665. The data recovery function 660, outputs data that is re-synchronised and can be output to a Rx processing feedback control function/sub-system (not shown).

An I-Q baseband data generation function 670 of the BBIC 650 is operably coupled to a BBIC differential line driver 675, to transmit I-Q data at 199.68 Mbps across the data interface. A differential buffer 640 of the RFIC 610 receives I-Q data at 199.68 Mbits/sec from the I-Q baseband data generation function 670 of the BBIC 650.

In this manner, a single clock source 615, selected to operate at a particular clock rate of N*199.68 MHz, is used to generate I-Q data streams in both the BBIC 650 and RFIC 610. Furthermore, the single clock source 615 is used to implement data recovery in both the RFIC 610 and BBIC 650, from data transferred at the I-Q data of 199.68 Mbits/sec across the data interface. The use of this I-Q data rate of 199.68 Mbits/sec ensures that the clock signals passed over the data interface do not generate any harmonics at any of the 3G frequencies transmit from, or received to, the wireless communication device.

The above two embodiments are not considered as the only arrangements capable of utilising the inventive concepts described herein, as other architectures may also be implemented that could benefit from a selection of a data rate to minimise harmonic interference. An example of such an architecture would be one based on encoders to encode the data (at the transmitting side) at a data rate of 199.68 Mbits/sec and a corresponding decoder (at the receiving side) to likewise decode the received data at 199.68 Mbits/sec. Any number of different encoder/decoder techniques could be used in such architecture, such as Manchester encoders/decoders, as known in the art.

The inventive concepts hereinbefore described relate to generation of a clock rate of 199.68 Mbits/sec. However, it is within the contemplation of the present invention that variations of this frequency (or multiples thereof) may still be used that fall within the tolerances of the required data rates for one or more respective communication modes, whereby harmonics substantially fall outside of one or more respective communication mode frequency bands. Furthermore, it is envisaged that multiples of the clock rate of 199.68 Mbits/sec may be used, where such a configuration would still benefit from the inventive concepts described above.

Although the inventive concepts are described with reference to a low voltage differential signal (LVDS) type on the data interface, a skilled artisan will appreciate that other signalling types and data interfaces are able to utilise the inventive concepts employed herein, such as a single-ended data interface. A skilled artisan will also appreciate that the clock source in the above embodiments may also be sourced from the BB IC (or another sub-system) in contrast to the RFIC shown.

Furthermore, although the inventive concepts are hereinbefore described with respect to generation of I-Q data, a skilled artisan will appreciate that the inventive concepts are equally applicable to any data type, such as polar co-ordinate data, demodulated data, raw data, etc.

It will also be appreciated by a skilled artisan that although the above concepts have been described with reference to a BBIC-RFIC interface, the inventive concepts are equally applicable to any data interface. Furthermore, it is envisaged that the inventive concepts are not limited to a dual 3G-2-xG wireless communication device, but are applicable to any multimode wireless communication device, for example a wireless communication device supporting Bluetooth™ or ultra wideband orthogonal frequency division multiplex (UWB OFDM) technology.

It is envisaged that the aforementioned inventive concepts can be applied to most transceiver architectures and platform solutions, i.e. a semiconductor manufacturer may employ the inventive concepts in a design of a stand-alone RFIC and/or BBIC and/or any other sub-system element.

It will be understood that the data interface and operation thereof described above aims to provide one or more of the following advantages:
  (i) A suitable data rate can be selected to be supported by the data interface that accommodates the desired bandwidth, clock rate and/or chip rate of the functional elements that are coupled by the data interface;
  (ii) The data rate is selected to avoid any harmonic interference generated by any functional element coupled via the data interface;
  (iii) In the context of a 3G-2.xG multimode handset, the data interface proposed herein enables 3G technology to be supported, for example within the DigRF standard;
  (iv) The use of 1248 MHz allows 2G/3G specific clocks to be generated without harmonic interference;
  (v) A clock rate of 199.68 Mbits/sec supports the required bandwidth of communication between a BBIC and a RFIC in a 3G implementation; and
  (vi) The concepts allow a single clock source to be used for the RFIC and BBIC and/or any other sub-system.

Thus, the present invention provides a number of advantages over current wireless communication devices incorporating data interfaces. In the context of a mobile phone, the provision of a data interface operating at a data transfer rate in the above manner, for example between a RFIC and a BBIC at an integer multiple of the 3G WBCDMA chip rate, effectively eliminates (or at least minimises) harmonic problems. In particular, in a 2.xG-3G scenario, the proposed solution provides harmonics that fall outside the 3G and 2.xG spectrum occupancy.

Furthermore, the proposed data interface allows a reduction in volume, cost and power consumption of the wireless device, when compared to current solutions, thus providing significant advantage to IC and wireless communication device manufacturers. Additionally, the proposed data interface also solves the issue of minimising pin count on the interface as both 'I' and 'Q' data, which can be sent separately for Tx and Rx operations, can now be multiplexed on to the same data stream.

Whilst the specific and preferred implementations of the embodiments of the present invention are described above, it is clear that one skilled in the art could readily apply variations and modifications of such inventive concepts.

Thus, a means of incorporating a data interface between integrated circuits (or sub-systems) in a wireless communication device has been described, where the aforementioned disadvantages with prior art arrangements, which need to accommodate interference due to clock harmonics, have been substantially alleviated.

The invention claimed is:

1. A wireless communication device that supports communication across a plurality of mobile telecommunication standards having a respective plurality of operational frequencies, the wireless communication device comprising:
  a number of sub-systems and a data interface operably coupled to sub-systems for routeing data therebetween; and
  the wireless communication device further comprises a clock generation function that generates a clock signal at a data transfer rate to be used over the data interface, wherein the clock generation function comprises a clock source operably coupled to a clock divider function for dividing a clock signal of the clock source to a clock signal at 199.68 MHz thereby facilitating generation of data for transferring over the data interface in accordance with any of the supported plurality of mobile telecommunications standards, where multiples of the clock signal at 199.68 MHz produce minimal harmonic content at the plurality of operational frequencies supported by the wireless communication device.

2. A wireless communication device according to claim 1, wherein the number of sub-systems comprise a radio frequency integrated circuit and/or a baseband integrated circuit.

3. A wireless communication device according to claim 1, wherein a baseband data generation function is operably coupled to the clock generation function to generate data for transferring over the data interface at the clock signal at 199.68 MHz.

4. A wireless communication device according to claim 3, wherein the baseband data generation function and the clock generation function are operably coupled to one or more differential line driver(s) and/or one or more differential buffer(s) to support data transfer over a differential line data interface.

5. A wireless communication device according to claim 1, wherein the clock generation function is located in one or more sub-systems operably coupled to the data interface.

6. A wireless communication device according to claim 1, wherein the clock signal of the clock source is also sent across the data interface.

7. A wireless communication device according to claim 6, wherein the clock source generates approximately a 1248 MHz clock signal.

8. A wireless communication device according to claim 1, wherein the plurality of mobile telecommunications standards comprises third generation and one or more variants of second generation mobile telecommunications standards.

9. An integrated circuit for use in a wireless communication device that supports communication across a plurality of mobile telecommunications standards having a respective plurality of operational frequencies, the integrated circuit comprising:
  a baseband data generation function;
  a clock generation function operably coupled to the baseband data generation function; and
  a plurality of ports operably coupled to a data interface for routeing data generated by the baseband data generation function within the wireless communication device; wherein
  the clock generation function comprises a clock source operably coupled to a clock divider function for dividing a clock signal of the clock source to a clock signal at 199.68 MHz thereby facilitating generation of data for transferring over the data interface in accordance with any of the supported telecommunications standards, where multiples of the clock signal at 199.68 MHz produce minimal harmonic content at the plurality operational frequencies supported by the wireless communication device.

10. An integrated circuit according to claim 9, wherein the integrated circuit is a radio frequency integrated circuit or a baseband integrated circuit.

11. An integrated circuit according to claim 9, wherein the clock signal of the clock source is also sent across the data interface.

12. An integrated circuit according to claim 11, wherein the clock source generates approximately a 1248 MHz clock.

* * * * *